No. 814,771. PATENTED MAR. 13, 1906.
S. P. COWARDIN.
ELECTRIC RAIL BOND AND METHOD OF MAKING SAME.
APPLICATION FILED MAR. 6, 1903.

Witnesses:
Jas. E. Hutchinson
W. C. Parker

Inventor.
Samuel P. Cowardin
by W. T. Hudson,
Attorney.

UNITED STATES PATENT OFFICE.

SAMUEL PENDLETON COWARDIN, OF RICHMOND, VIRGINIA.

ELECTRIC RAIL-BOND AND METHOD OF MAKING SAME.

No. 814,771. Specification of Letters Patent. Patented March 13, 1906.

Application filed March 6, 1903. Serial No. 146,542.

*To all whom it may concern:*

Be it known that I, SAMUEL PENDLETON COWARDIN, a citizen of the United States, residing at Richmond, in the county of Henrico and State of Virginia, have invented certain new and useful Improvements in Electric Rail-Bonds and Method of Making Same; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to electric rail-bonds and method of making the same; and it consists in a bond having the terminals and connections between the same formed of the same metal or of metals which will alloy with each other and joined or united together by another metal which will alloy with the same and be of a lower fusing-point than the metal or metals of the terminals and their connections; and the method consists in coating the ends of the connections with a metal which will alloy with and have a lower fusion-point than the metal of the connections and then molding to the ends of the connections the metal which will constitute the terminals, so that it will alloy with the ends of the connections through the instrumentality of the metal having the lower fusing-point, thereby bringing the metal of the terminal and the metal of the connections into intimate union.

To the accomplishment of the foregoing and such other objects as may hereinafter appear the invention consists in the features and in the operation hereinafter particularly described and then sought to be specifically defined by the claims, reference being had to the accompanying drawings, illustrating one means for carrying the invention into effect, and in which—

Figure 1:
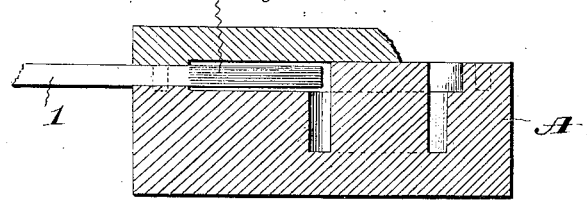
Figure 2:
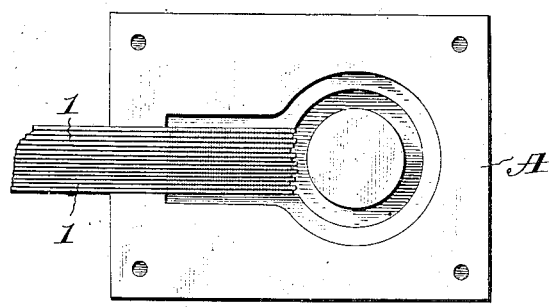
Figure 3:
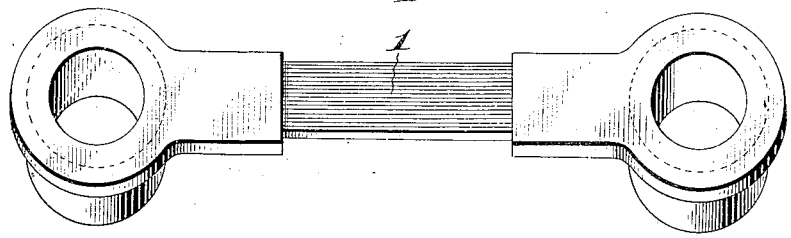

Figure 1 is a sectional view of one form of mold with the conductor-wires in position to receive the metal to form the terminal. Fig. 2 is a plan view of the same with the top of the mold removed, and Fig. 3 is a perspective of the conductor and its terminal.

In carrying out my invention I prefer to make use of a number of strands or wires 1, of copper, which will admit of being crumpled or bent so as to provide for expansion and contraction, although any other metal suitable for the purpose and which will be a conductor of an electric current may be employed. I coat the ends of the strands with a thin layer of metal that will alloy with the metal of the strands, and for that purpose prefer to employ tin. These strands, grouped as they are to come in the bond, are so placed that their ends project into a suitable mold A, adapted to receive the metal to constitute the terminals and give to it the shape desired for the terminal, and for the purpose I prefer to employ a mold which will form a hollow or ferrule-shaped terminal, although a mold to form any other style of terminal may be used. With the ends of the strands projecting into the mold the molten metal to constitute the terminal and consisting of copper or other metal which will alloy with the coated ends of the strands is poured into the mold, and it alloys with the coated ends of the strands and forms an intimate union therewith without the necessity of subsequent forging or compression to effect an intimate union between the metal of the terminals and the metal of the strands, since the employment of a metal that will melt or fuse at a lower point than the metal of the strands and the metal of the terminals and capable of alloying with the metal of the strands and of the terminals will effect such an intimate union between the strands and the terminals that forging or compression need not be employed, although the same can be employed, if desired, without detriment to the process or to the bond produced. The thin coating of tin on the ends of the conductor is so diffused when the molten copper forming the terminal comes in contact with it that it forms a true alloy with the copper instead of a mere solder, so that it practically disappears as a coating and enters into such intimate mixture with the copper that the metal of the conductor and the metal of the terminal come into intimate union one with the other. The alloy thus formed between the copper and the metal of lower fusing-point effects such a continuity of union between the conductor and the terminal that it is practically the same as if the bond were made out of a single piece of metal instead of two metals, one joined to the other. This results in the least possible resistance, if any at all, being offered to the current passing from one terminal to another through the intermediate conductor. It is believed that when the copper strands are coated with a thin layer of tin there is formed at the surface of the strands a thin layer of copper and tin alloy, so that when the molten copper to form the terminals is poured into the mold in contact with the strands it alloys at once with the coating on the strands, so that the metal of the strands and of the terminals are brought into more intimate union than otherwise would be the case and without melting the copper strands to destroy their individuality; but if the heat should be such as to destroy the individuality of the strands at the ends where the metal of the terminals unites with the metal of the strands the presence of the other metal which fuses at a lower point would make the union so intimate that a better conductor or bond for the flow of the electric current would be produced than under other constructions.

While I prefer to employ copper for the terminals and their connections and tin as the other metal to make the alloy, yet the invention in its scope includes other metals than copper for the terminals and connections and other metals than tin for the coating, the metals being such that they will alloy with each other and with the metal coating and the metal coating being such that it will fuse or melt at a lower point than the other metals employed.

Having described my invention and set forth its merits, what I claim is—

1. An electric rail-bond comprising a conductor and a terminal each formed of a metal which will alloy with the metal of the other, the metal of the terminal being in intimate union with the metal of the conductor and alloyed with a metal having a lower fusing-point than that of the conductor and terminal, substantially as described.

2. The method of forming an electric rail-bond consisting in applying to the end of the conductor a metal having a lower fusing-point than the metal of the conductor and of the terminal and then applying molten metal to the end of the conductor to form the terminal, and effecting a union between the terminal and conductor by alloying the metal of the conductor and terminal with the metal of lower fusing-point, substantially as described.

In testimony whereof I affix my signature in presence of two witnesses.

SAMUEL PENDLETON COWARDIN.

Witnesses:
WILLIAM S. CAMP,
O. RAYMOND BROWN